(12) United States Patent
Heller et al.

(10) Patent No.: US 8,909,682 B2
(45) Date of Patent: Dec. 9, 2014

(54) DIGITAL MEDIA BUNDLES FOR MEDIA PRESENTATION PLAYBACK

(75) Inventors: David Heller, Los Altos, CA (US);
Oliver Krevet, San Jose, CA (US);
Aaron Braunstein, San Jose, CA (US);
David Makower, Milpitas, CA (US);
Juan Carlos Jimenez, Campbell, CA (US)

(73) Assignee: Apple Inc., Cupertino, CA (US)

( * ) Notice: Subject to any disclaimer, the term of this patent is extended or adjusted under 35 U.S.C. 154(b) by 303 days.

(21) Appl. No.: 12/690,807

(22) Filed: Jan. 20, 2010

(65) Prior Publication Data

US 2011/0060742 A1 Mar. 10, 2011

Related U.S. Application Data

(63) Continuation-in-part of application No. 12/555,750, filed on Sep. 8, 2009, now abandoned.

(51) Int. Cl.
*G06F 17/30* (2006.01)
*H04N 7/173* (2011.01)
*H04N 21/4143* (2011.01)
*H04N 21/472* (2011.01)
*H04N 21/854* (2011.01)

(52) U.S. Cl.
CPC ...... *G06F 17/3002* (2013.01); *G06F 17/20056* (2013.01); *H04N 21/4143* (2013.01); *H04N 21/47202* (2013.01); *H04N 21/854* (2013.01); *Y10S 707/913* (2013.01)
USPC .............................. 707/804; 707/913; 725/86

(58) Field of Classification Search
USPC ................................ 725/37, 86; 707/804, 913
See application file for complete search history.

(56) References Cited

U.S. PATENT DOCUMENTS

| 6,452,609 | B1 | 9/2002 | Katinsky et al. |
| 7,793,823 | B2 * | 9/2010 | Klein, Jr. ................ 235/375 |
| 7,844,498 | B2 | 11/2010 | Robbin et al. |
| 7,899,714 | B2 | 3/2011 | Robbin et al. |
| 2002/0091848 | A1 | 7/2002 | Agresta et al. |
| 2002/0104019 | A1 | 8/2002 | Chatani et al. |
| 2002/0129089 | A1 | 9/2002 | Hegde et al. |
| 2002/0138439 | A1 | 9/2002 | Matsushima et al. |
| 2002/0138593 | A1 | 9/2002 | Novak et al. |

(Continued)

FOREIGN PATENT DOCUMENTS

| WO | 2004/052012 A1 | 6/2004 |
| WO | WO 2004/052012 A1 | 6/2004 |

OTHER PUBLICATIONS

"EverAd Enables Windows Media Player Users to Download PlayJ-Based Free and Authorized Music," PR Newswire, New York, Jun. 8, 2000, p. 1.

(Continued)

*Primary Examiner* — Jorge A Casanova
(74) *Attorney, Agent, or Firm* — Novak Druce Connolly Bove + Quigg LLP

(57) ABSTRACT

Media bundles that can be submitted, distributed and utilized to facilitate media presentations at client devices. Each media presentation is typically associated with a digital media asset. The media bundles can include or identify various digital media assets for use in the media presentations and can provide computer instructions for controlling the media presentations. The resulting media presentations can provide multimedia experiences for users of client devices.

18 Claims, 8 Drawing Sheets

(56) References Cited

U.S. PATENT DOCUMENTS

| | | |
|---|---|---|
| 2002/0138852 A1* | 9/2002 | Reynolds et al. ............. 725/136 |
| 2003/0079042 A1 | 4/2003 | Yamanaka et al. |
| 2003/0084460 A1 | 5/2003 | Chung et al. |
| 2003/0101092 A1 | 5/2003 | Fuller et al. |
| 2004/0148424 A1 | 7/2004 | Berkon |
| 2004/0268451 A1 | 12/2004 | Robbin et al. |
| 2005/0010573 A1* | 1/2005 | Garg ............................... 707/10 |
| 2005/0021478 A1 | 1/2005 | Gautier et al. |
| 2005/0050345 A1 | 3/2005 | Dowdy et al. |
| 2005/0102191 A1 | 5/2005 | Heller |
| 2005/0111663 A1 | 5/2005 | Lotspiech et al. |
| 2005/0165843 A1 | 7/2005 | Capps et al. |
| 2005/0203959 A1 | 9/2005 | Muller et al. |
| 2005/0256770 A1 | 11/2005 | Popkin et al. |
| 2006/0074810 A1* | 4/2006 | Verberkt et al. ................ 705/57 |
| 2006/0089949 A1 | 4/2006 | Robbin et al. |
| 2006/0095339 A1 | 5/2006 | Hayashi et al. |
| 2006/0123052 A1 | 6/2006 | Robbin et al. |
| 2006/0190290 A1* | 8/2006 | Gomez ............................. 705/1 |
| 2007/0130177 A1* | 6/2007 | Schneider et al. ............ 707/100 |
| 2007/0180468 A1* | 8/2007 | Gill et al. ........................ 725/45 |
| 2008/0140433 A1* | 6/2008 | Levy et al. ........................ 705/1 |

OTHER PUBLICATIONS

International Search Report and Written Opinion for PCT/US2010/047902, mailed Mar. 31, 2011.

* cited by examiner

DIGITAL MEDIA BUNDLES FOR MEDIA PRESENTATION PLAYBACK

CROSS-REFERENCE TO OTHER APPLICATIONS

This application is a continuation-in-part of U.S. patent application Ser. No. 12/555,750, filed Sep. 8, 2009, now abandoned, and entitled "DIGITAL MEDIA BUNDLES FOR MEDIA PRESENTATION PLAYBACK", which is herein incorporated by reference;

This application also references: (i) U.S. patent application Ser. No. 12/555,539, filed Sep. 8, 2009, and entitled "PROGRAMMING INTERFACE FOR USE BY MEDIA BUNDLES TO PROVIDE MEDIA PRESENTATIONS", which is herein incorporated by reference; and (ii) U.S. patent application Ser. No. 12/555,643, filed Sep. 8, 2009, and entitled "DISTRIBUTION AND USAGE OF MEDIA BUNDLES", which is herein incorporated by reference.

BACKGROUND OF THE INVENTION

1. Field of the Invention

The present invention relates to media bundles and, more particularly, to media bundles that enable media presentation playback.

2. Description of the Related Art

Digital Versatile Discs (DVDs) are a popular means to distribute of video media content, such as movies. DVDs can be purchased or rented either from physical stores or online stores. It is common for DVD to contain not only the electronic file containing to video media content (e.g., for a movie) but also an introductory interactive media portion that provides introductory multimedia effects as well as a menu. The menu enables a user of a playback device, such as a DVD player or a personal computer, to make a menu selection. The menu can, for example, enable the user of the playback device to: start movie playback at a selected scene or chapter, play director's commentary, play deleted scenes, etc.

Conventionally, content providers have been able to submit digital media assets under their control to an online media distribution site for further distribution. In recent years, advanced online media distribution sites, such as iTunes™ media store, have permitted online submission of digital media assets, such as songs, movies, television shows and application programs, to the online media distribution site.

However, when videos (e.g., movies) are electronically submitted to an online distribution site, there is no ability to provide support for introductory interactive media (e.g., menu) functionality as is available with DVDs. As a result, when a downloaded video is played, playback of the video is activated without introductory interactive media. Consequently, electronically delivered videos cannot offer the same playback experience as is available with DVDs.

Thus, there is a need for enhanced video distribution that permits electronically delivered videos to provide interactive media functionality.

SUMMARY

The invention pertains to use of media bundles that can be submitted, distributed and utilized to facilitate media presentations at client devices. Each media presentation is typically associated with a digital media asset. The media bundles can include or identify various digital media assets for use in the media presentations and can provide computer instructions for controlling the media presentations. The resulting media presentations can provide multimedia experiences for users of client devices.

In one embodiment, a media bundle once created can be described and electronically submitted to a network-based media distribution system. The network-based media distribution system can validate and approve a submitted media bundle for distribution. For example, once approved, the submitted media bundle can be made available for acquisition at an online media store. Users of client devices are thereafter able to access the online media store via a network and acquire a digital media asset and its associated media bundle. If acquired, the digital media asset and the associated media bundle can be electronically delivered to the client device. The digital media asset and the associated media bundle can then be stored at the client device. When the associated media bundle is subsequently activated, it can produce a media presentation at the client device. Although a media presentation normally pertains to a digital media asset, the media presentation is typically a multimedia presentation that plays and/or displays one or more digital media assets that are provided either within the media bundle or within a local media library stored on the client device.

The client device can, for example, be a computing device. Examples of a computing device include a personal computer (e.g., desktop computer, notebook computer or netbook computer), or a portable handheld electronic device (e.g., Portable Digital Assistant (PDA), multi-function mobile telephone).

The invention can be implemented in numerous ways, including as a method, system, device, apparatus (including computer readable medium and graphical user interface). Several embodiments of the invention are discussed below.

As a computer readable medium, one embodiment includes at least one digital media bundle. The digital media bundle can, for example, including at least (i) associated media item information that identifies at least a media item in a media library accessible to a client computing device that is associated with the digital media bundle; and (ii) computer program code for coordinating playback of a media presentation at the client computing device. The media presentation can pertain to the media item.

As a computer readable medium, one embodiment includes at least one digital media bundle. The digital media bundle can, for example, including at least (i) associated media item information that identifies at least a media item in a media library accessible to a client computing device that is associated with the digital media bundle; (ii) mapping data configured to associate vendor identifiers to distributor identifiers; and (iii) computer program code for coordinating playback of a media presentation at the client computing device, wherein the media presentation pertains to the media item, and wherein the mapping data is used to assist the computer program code in locating at least one presentation media item in the media library.

As a method for providing a digital media bundle on a client device, one embodiment can, for example, include at least: requesting acquisition of a digital media asset and a digital media bundle from a network-based distribution server, the digital media bundle being associated with the digital media asset, the digital media bundle including presentation configuration data to provide a presentation pertaining to the digital media asset; receiving, at the client device, electronic delivery of the digital media asset and the digital media bundle from the network-based distribution server; forming a bundle folder on a file system of the client device; and storing the digital media bundle, including the presentation configuration data, in the bundle folder.

As a method for supporting network-based distribution of media bundles, one embodiment can, for example, include at least: receiving an electronic submission of a submitted media bundle package, the submitted media bundle package including at least a bundle description and a media bundle; validating the submitted media bundle package; determining whether the submitted media bundle package has been successfully validated; and rendering the media bundle available for network-based distribution if the submitted media bundle package has been successfully validated. The media bundle includes at least: associated media item information that identifies at least a media item in a media library accessible to a client computing device that is associated with the digital media bundle; and computer program code for coordinating playback of a media presentation at the client computing device. The media presentation can pertain to the media item. The mapping data can be used to assist the computer program code in locating at least one presentation media item in the media library.

As a computer readable medium including at least computer program code stored therein for providing a digital media bundle on a client device, one embodiment of the invention can, for example, include at least: computer program code for requesting acquisition of a digital media asset and a digital media bundle from a network-based distribution server, the digital media bundle being associated with the digital media asset, the digital media bundle including presentation configuration data to provide a presentation pertaining to the digital media asset;

computer program code for receiving, at the client device, electronic delivery of the digital media bundle from the network-based distribution server; computer program code for forming a bundle folder on a file system of the client device; and computer program code for storing the digital media bundle, including the presentation configuration data, in the bundle folder.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF EMBODIMENTS OF THE INVENTION

The invention pertains to use of media bundles that can be submitted, distributed and utilized to facilitate media presentations at client devices. Each media presentation is typically associated with a digital media asset. The media bundles can include or identify various digital media assets for use in the media presentations and can provide computer instructions for controlling the media presentations. The resulting media presentations can provide multimedia experiences for users of client devices.

In one embodiment, a media bundle once created can be described and electronically submitted to a network-based media distribution system. The network-based media distribution system can validate and approve a submitted media bundle for distribution. For example, once approved, the submitted media bundle can be made available for acquisition at an online media store. Users of client devices are thereafter able to access the online media store via a network and acquire a digital media asset and its associated media bundle. If acquired, the digital media asset and the associated media bundle can be electronically delivered to the client device. The digital media asset and the associated media bundle can then be stored at the client device. When the associated media bundle is subsequently activated, it can produce a media presentation at the client device. Although a media presentation normally pertains to a digital media asset, the media presentation is typically a multimedia presentation that plays and/or displays one or more digital media assets that are provided either within the media bundle or within a local media library stored on the client device.

The client device can, for example, be a computing device. Examples of a computing device include a personal computer (e.g., desktop computer, notebook computer or netbook computer), a set-top box, or a portable handheld electronic device (e.g., Portable Digital Assistant (PDA), multi-function mobile telephone).

Several embodiments of the invention are discussed below with reference to FIGS. 1-8. However, those skilled in the art will readily appreciate that the detailed description given herein with respect to these figures is for explanatory purposes as the invention extends beyond these limited embodiments.

Figure 1:
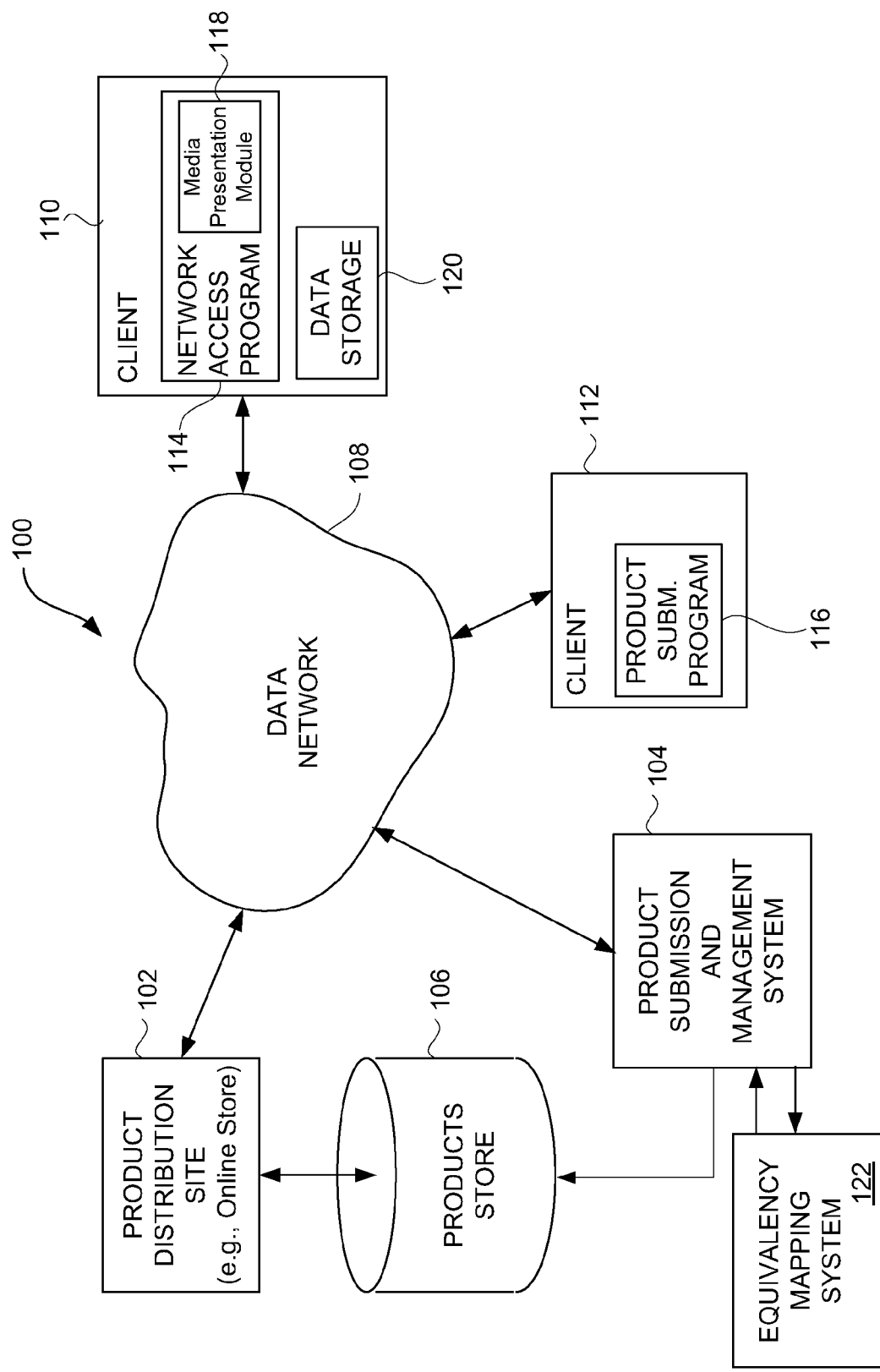
FIG. 1 is a block diagram of a product submission and distribution system according to one embodiment.

FIG. 1 is a block diagram of a product submission and distribution system 100 according to one embodiment. The product submission and distribution system 100 includes a product distribution site 102. The product distribution site 102 provides an online access point for distribution of various digital products. For example, the product distribution site 102 can be referred to as an online store. A product submission and management system 104 operates to receive submissions of digital products from various digital product submitters. The product submission and management system 104 can process submission of digital products and authorize distribution of approved digital products.

The digital products can be stored in a products store 106. In one embodiment, the products store 106 includes a mass data store and one or more databases. The products store 106 provides mass storage of the numerous digital products that are available for distribution (e.g., purchase or rental). For example, digital products that have been purchased can be accessed from the products store 106 over a data network 108 by way of the product distribution site 102. Examples of digital products include digital media assets (e.g., media items) or computer program products. Media items can pertain to music (e.g., songs or albums) or video (e.g., movies or television shows). Computer program products can pertain to applications (or application programs), animations, or presentations. Digital media assets can also include media bundles. Media bundles can include presentation configuration data, such as program code and/or conversion data (e.g., mapping data). Media bundles can also include one or more media items.

The product submission and distribution system 100 also includes a first client 110 and a second client 112. Typically, the product submission and distribution system 100 would include a plurality of different clients 110, 112. The first client 110 includes a network access program 114. The second client 112 includes a product submission program 116. Some clients can also include both the network access program 114 and the product submission program 116.

The network access program 114 is an application program (e.g., software application) that operates on the first client 110, which is a computing device. One example of a suitable network access program is a network browser (e.g., Microsoft Explorer or Safari). Another example of a suitable network access program is iTunes™ offered by Apple Inc. The first client 110 is coupled to the product distribution site 102 through the data network 108. Hence, the first client 110 can interact with the product distribution site 102 to review, purchase, execute, play and/or manage digital products.

The network access program 114 can include a media presentation module 118. The media presentation module 118 can operate to provide a media presentation at the first client 110. The first client 110 has a media bundle that governs the media presentation. As previously noted, a media bundle can be considered a digital product. A media bundle can also be considered part of or a supplement to another digital product, such as a digital media asset. The contents of a media bundle can be considered components of the media bundle, namely, bundle components. The bundle components can include one or more of computer program code, conversion data and/or digital media item(s). The computer program code can serve to define and/or control the presentation. The presentation can, for example, present one or more digital media assets at the first client 110. The media presentation module 118 can execute or interpret the computer program code within the media bundle to provide the presentation at the first client 110. For example, in one embodiment, the computer program code within the media bundle can use a script language, such as Javascript.

The first client 110 can also provide a data storage 120 that provides local storage for various digital products. The digital products stored in the data storage 120 can include digital media assets, media bundles, etc. In one embodiment, media bundles can be stored in electronic folders (or directories) on a file system supported by the data storage 120. The digital media assets at the client device 110 can be considered as part of a media library (e.g., local media library). In one embodiment, those digital media assets, if any, within the media bundles would be stored in electronic folders (or directories) on the file system supported by the data storage 120 as opposed to being stored in the media library.

The product submission program 116 is an application program (e.g., software application) that operates on the second client 112, which is a computing device. The product submission program 116 is used to submit digital products to the product submission and management system 104 for eventual distribution by the media distribution site 102. Although the network access program 114 and the product submission program 116 are shown in FIG. 1 as separate programs, it should be understood that such programs can be integrated into a single program or reside on the same client machine.

The media distribution system 100 can also include an equivalency mapping system 122. The equivalency mapping system 122 can interact with the product submission and management system 104 to identify digital media assets that are equivalent to one another. By using computer-implemented techniques to determine which digital media assets are equivalent to one another, digital media assets within media bundles can make use of "equivalent" digital media assets if the exact digital media asset specified by the media bundle is unavailable at the first client 110. The "equivalent" digital media assets are backup or alternative digital media assets that can be used in place of a specified digital media asset that is not available. There are many examples of "equivalent" digital media assets. As one example, if a specified digital media asset represents a song on an album but such is unavailable at a client, then an alternative digital media asset could be the version of that same song that was purchased as a single or the same song as available on a compilation album, which may have been purchase previously and installed (and thus available) on the client.

In the product submission and distribution system 100 shown in FIG. 1, the digital products (e.g., including media bundles) are submitted to the product submission and management system 104 by way of the product submission program 116. The digital products that have been submitted (e.g., via the second client 112) are processed and then stored in the products store 106. Thereafter, the stored digital products are available to be purchased from the product distribution site 102. Upon purchasing a particular digital product, the product distribution site 102 permits the digital data for the particular digital product to be retrieved from the products store 106 and then delivered (e.g., downloaded) from the product distribution site 102 to the requesting client 110 through the data network 108. In this regard, the product distribution site 102 or some other delivery server (not shown) obtains the digital data corresponding to the particular digital product from the products store 106 and downloads such digital data through the data network 108 to the client 110. The downloaded digital data can then be stored on the client 110. In one embodiment, the downloaded digital data is encrypted as received at the client 110 but is decrypted and then perhaps re-encrypted before persistently stored on the client 110. In another embodiment, the downloaded digital data is encrypted as received at the client 110 and also persistently stored on the client 110 in an encrypted manner. Thereafter, the client 110 can utilize (e.g., play, execute, etc.) the digital data of the digital product at the client 110.

The product submission and distribution system 100 allows a user of the client 110 to utilize the network access program 114 to browse, search or sort through a plurality of digital products that can be purchased from the product distribution site 102. The network access program 114 may also allow the user to preview or demo some or all of a digital product. In the event that the user of the network access program 114 desires to purchase a particular digital product, the user (via the network access program 114) and the product distribution site 102 can engage in an online commerce transaction in which the user pays for access rights to the particular digital product.

The submission and purchase of the digital products can be achieved over the data network 108. In other words, the submission and purchase of the digital products can be achieved online. The purchase of media items online can also be referred to as electronic commerce (e-commerce). In one embodiment, the data network 108 includes at least a portion of the Internet. The clients 110, 112 can vary with application but generally are computing devices that have memory storage. Often, the clients 110, 112 are personal computers or other computing devices that are capable of storing and presenting media to their users. In one embodiment, the connections through the data network 108 between the product distribution site 102 and the clients 110, 112 can be through secure connections, such as Secure Sockets Layer (SSL).

Although the product distribution site 102, the product submission and management system 104, the products store 106 and the equivalency mapping system 122 are shown in FIG. 1 as being separate components, it should be understood that any of these components can be combined into one or more apparatus. For example, the product submission and management system 104 can be incorporated into the product distribution site 102. As another example, the products store 106 can be incorporated into the product distribution site 102 or the product submission and management system 104.

Figure 2:
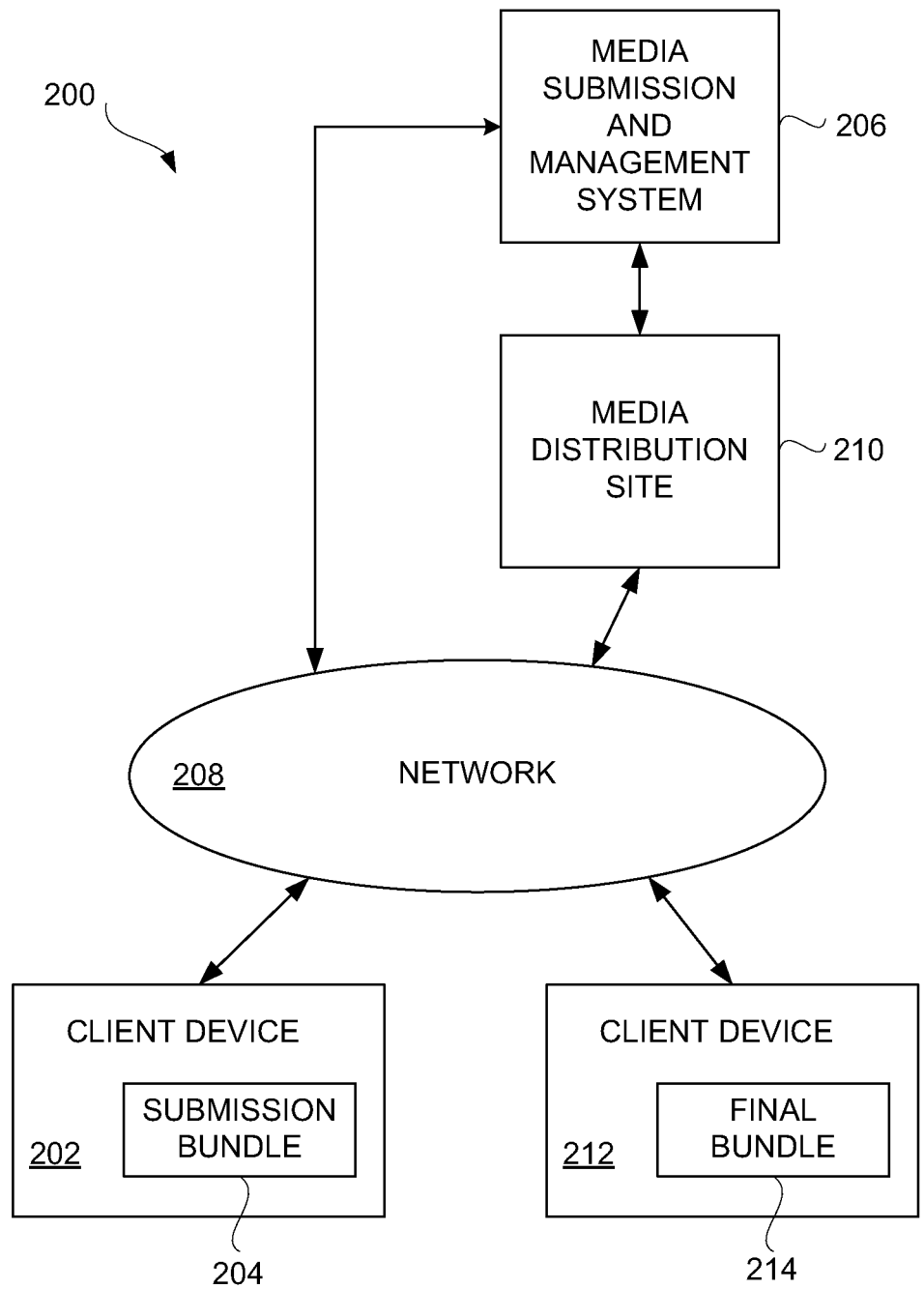
FIG. 2 is a block diagram of a media bundle submission and distribution system according to one embodiment.

FIG. 2 is a block diagram of a media bundle submission and distribution system 200 according to one embodiment. The media bundle submission and distribution system 200 can, for example, be implemented by the product submission and distribution system 100 illustrated in FIG. 1.

The media bundle submission and distribution system 200 can support one or more client devices 202. The media bundle submission and distribution system 200 can receive one or more submission bundles 204 from the one or more client devices 202. The submission bundles 202 are provided to a media submission and management system 206. The submission of the submission bundles 204 can be performed electronically such as over a network 208. The network 208 can, for example, include or pertain to a wide area network or global area network. As an example, the network 208 can include or make use of the Internet. The one or more client devices 202 and the media submission and management system 206 can exchange data, such as the submission bundles 204, through the network 208.

The media submission and management system 206 can operate to validate the submission bundles 204. To the extent the submission bundles 204 are approved for distribution, the submission bundles 204 can be rendered available for distribution. At this point, media bundles resulting from the submission bundles 204 can be stored on or otherwise made available to a media distribution site 210. The media distribution site 210 can also couple to the network 208.

The media bundle submission and distribution system 200 can also include one or more client devices 212. The one or more client devices 212 can also couple to the network 208. The one or more client devices 212 are able to acquire media bundles that are available for distribution from the media distribution site 210. Often, but not necessarily, a media bundle is acquired when a digital media assets is acquired. For example, a media bundle can be associated with a digital media asset, such as an album of music or a movie; hence, on acquisition (e.g., purchase) of the album or movie, the associated media bundle can also be acquired as part of or included in the acquisition of the album or movie.

In any case, the acquisition of the media bundles typically involves a user designating (directly or indirectly) one or more media bundles to be acquired through interaction between the one or more client device 212 and the media distribution site 206. Thereafter, the one or more designated media bundles can be downloaded to the respective one or more client devices 212 to the extent that such media bundles have been acquired (e.g., which may require purchase or rental). Finally, the media bundles that have been downloaded to the one or more client devices 212 can be installed as final bundles 214. One embodiment of an installation process for a media bundle is described below with reference to FIG. 7. Once the final bundles 214 have been installed on the one or more client devices 212, the one or more client devices 212 can initiate playback of the final bundles 214 to provide media presentations at the one or more client devices 214.

Although FIG. 2 illustrates client devices 210 and 212, it should be noted that any number of client devices can be coupled to the network 208 to access the media distribution site 206 and thereby submit, acquire and/or receive media bundles. The client device 202 providing submission of the submission bundle 204 is, for example, representative of the client device 112 with the product submission program 116 used for the submission. The client device 212 providing acquisition and receipt of the final bundle 214 is, for example, representative of the client device 212 with the network access program 114 used for the acquisition and receipt of the final bundle 214.

Figure 3:
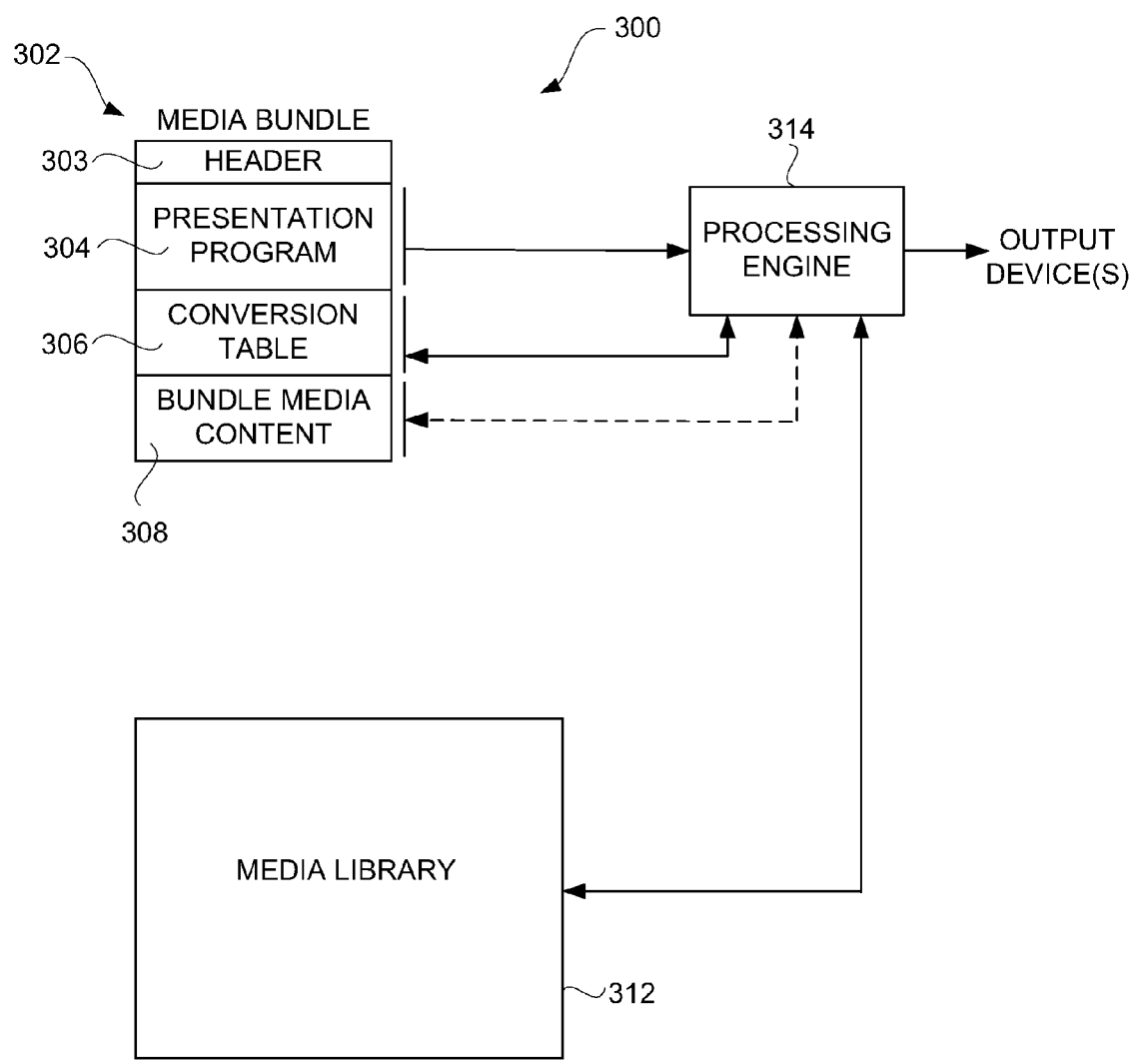
FIG. 3 is a block diagram of a media presentation system according to one embodiment.

FIG. 3 is a block diagram of a media presentation system 300 according to one embodiment. The media presentation system 300 includes a media bundle 302. The media bundle 302 is a container for a plurality of bundle components. In the embodiment of the media bundle 302 illustrated in FIG. 3, the bundle components for the media bundle 302 includes: a header 303, a presentation program 304, a conversion table 306, and bundle media content 308. The media presentation system 300 also includes a media library 312 that stores various digital media assets. In particular, in one embodiment, the media bundle 302 is associated with at least one particular digital asset stored in the media library 312. As one example, the media bundle 302 can be associated with at least one digital media asset, such as a movie, an album of songs, or a television show. The header 303, for example, can include data that associates the media bundle 302 to the at least one particular digital media asset. For a given digital media asset stored in the media library 312, the media library 312 can also store an identification of, and/or a storage location for, a media bundle associated therewith, if any. The media library 312 can pertain to a local media library (e.g., stored at client device) or a remote media library (e.g., stored at a remote media repository).

The media presentation system 300 also includes a processing engine 314. The processing engine 314 can, in one embodiment, operate to perform the presentation program 304 with respect to the media bundle 302 so as to produce output data for one or more output devices of or associated with the client device 212. The output devices are, for example, a display and/or speaker. The processing engine 314 can execute (including interpret) the presentation program 304 of the media bundle 302. In executing (including interpreting) the presentation program 304, the processing engine 314 will be directed to access and present one or more of the digital media assets. These digital media assets can be in the bundle media content 308 and/or in the media library 312. Since the digital media assets in the media library 312 may come from a media distribution system before, with or after receiving the media bundle 302, these digital media assets in the media library 312 are primarily identified using distributor identifiers.

In some cases, these digital media assets may be identified in the presentation program 304 by the use of a producer identifier. The processing engine 314 can utilize and interact with the conversion table 306 provided in the media bundle 302 to convert the provider identifiers to distributor identifiers that are understood by a media distribution system. Since the media distribution system can provide the digital media assets associated with the media bundle 302 to the media library 312, the processing engine 314 needs to associate provider identifiers to the distributor identifiers so that the appropriate digital media assets may be located and utilized by the presentation program 304 to produce the desired output for the one or more output devices.

As noted above, a media bundle can include conversion data (e.g., mapping data) as one bundle component. The conversion data can serve to correlate (e.g., map) provider identifiers to distributor identifiers so that digital media assets are able to be identified in and retrieved from a media library (e.g., as part of a media presentation being provided by a media bundle. Tables I and II are provided and described below as a representative illustration of conversion data.

Table I provided below pertains to an exemplary conversion table containing provider identifiers upon submission of a media bundle. The conversion table contains a list of provider identifiers that pertains to digital media assets referenced by the media bundle. However, the conversion table does not contain corresponding distributor identifiers.

TABLE I

| Provider Identifier | Distributor Identifier |
|---|---|
| provider123.new_song_abc | |
| provider123.new_video_def | |
| provider123.new_TVshow_ghi | |
| provider123.new_song_jkl | |

Table II provided below pertains to an exemplary conversion table that contains distributor identifiers that correspond to (e.g., map to) provider identifiers. Following submission of a media bundle, a media distribution server can complete the conversion table by adding conversion data thereto. The conversion table can be referred to as a mapping table, and the conversion data can also be referred to as mapping data. The conversion table shown in Table II represents the conversion table that is received at a client device from the media distribution server, either separate from or together with the media bundle.

TABLE II

| Provider Identifier | Distributor Identifier |
|---|---|
| provider123.new_song_abc | 01jgar12942; 01wkdh2k43; 01ifh371h3 |
| provider123.new_video_def | 02ics1482e |
| provider123.new_TVshow_ghi | 03ifo2kew4 |
| provider123.new_song_jkl | 01lsea19n4 |

As shown in Table II, in one embodiment, a given provider identifier can be associated with one or more distributor identifiers. In the case where there are more than one distributor identifiers mapped to a particular provider identifier, in one embodiment, the first listed distributor can represent the same digital media asset as that denoted by the corresponding product identifier, and any other listed distributor identifiers can represent digital media assets that can be deemed equivalent to the corresponding product identifier. For example, as shown in Table II, the product identifier "provider123.new_song_abc" which pertains to a particular song can correspond exactly to the distributor identifier "01jgar12942" and equivalently to "01wkdh2k43" or "01ifh371h3". The equivalent distributor identifiers can be listed in order of preference. As an example, the particular song might be a live version of a song, and the matching distributor identifier would denote that same live version of the particular song, with the equivalent distributor identifiers, if any, denoting different versions of the particular song, such as a studio version of the particular song, a remix of the particular song, a "clean" version of the particular song, etc.

The advantage of providing equivalent distributor identifiers is that when operating a media bundle at a client device to provide a media presentation, the presentation of digital media assets in accordance with the media bundle can be successfully performed even if the user's client device lacks the exact digital media asset so long as an acceptable alternative (e.g., equivalent) digital media asset is available.

In another embodiment, provider identifiers can be structured to include three components. A first component, a prefix, denotes a specific content provider. In one embodiment, the first component, or prefix, can denote a namespace that can used by one or more content providers. In the case where the prefix is used by more than one content provider, the prefix can be referred to as a shared prefix. A second component, a scheme, specifies a type of identifier being used. A third component, an identifier, provides an identifier that conforms to the scheme. An example of a provider identifier in accordance with this embodiment is "provider123:isrc:USRC10900295". In this example, the scheme for the provider identifier is "isrc" representing International Standard Recording Code for sound recording and music videos. In other examples, the schemes can use: "upc" representing a UPC code, "isan" International Standard Audiovisual Number for video content, "grid" for Global Release Identifier standard used by the recording industry, or "vendor_id" a content providers custom identifier.

Figure 4:
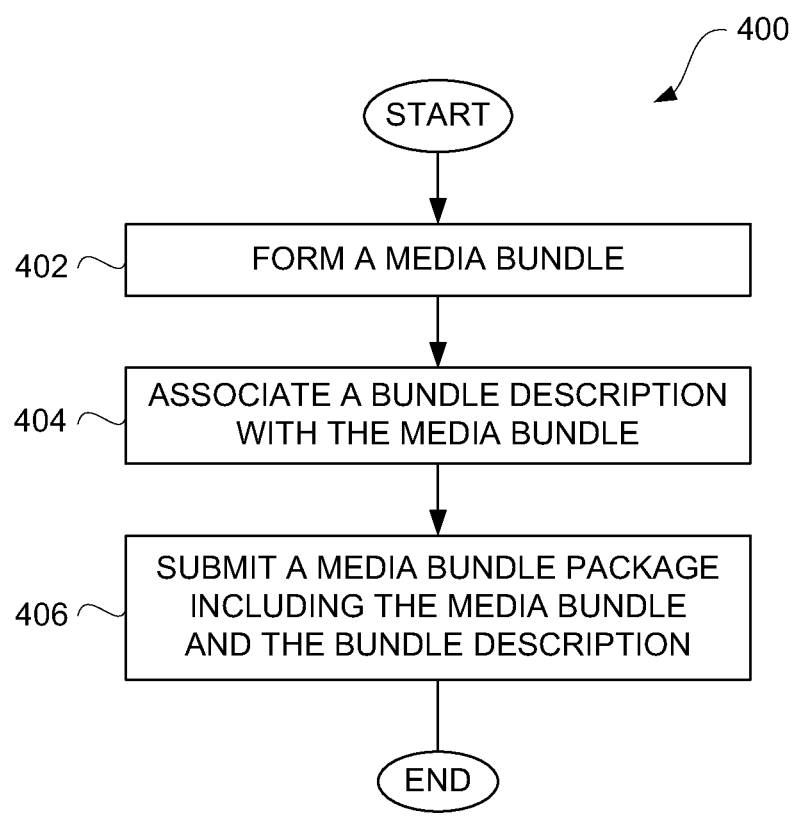
FIG. 4 is a flow diagram of a media bundle submission process according to one embodiment.

FIG. 4 is a flow diagram of a media bundle submission process 400 according to one embodiment. The media bundle submission process 400 can, for example, be performed by a client device and/or its user (submitter) that desires to submit a media bundle for distribution.

The media bundle submission process 400 can initially form 402 a media bundle. The media bundle can include a header, a presentation program, conversion table, and bundle media content, each of which can be referred to as bundle components. A media bundle description can also be associated 404 with the media bundle. The bundle description can, in one embodiment, not only provide descriptive metadata for the media bundle itself but also specify an associated media item (e.g., one or more media items) to which the media bundle is to be associated. As an example, a media bundle typically is designed (e.g., formed) to pertain a particular media item that is made available for distribution, and thus the media bundle can be made available for distribution along with the particular media item. After the media bundle has been formed 402 and the bundle description has been associated 404 with the media bundle, a media bundle package including the media bundle and the bundle description can be submitted 406 to a media distribution system. For example, the media distribution system can pertain to the product submission and management system 104 illustrated in FIG. 1 or the media submission and management system 206 illustrated in FIG. 2.

In an alternative embodiment, the bundle description to be associated 404 with the media bundle can be performed after the submission 406 of the media bundle package. For example, a bundle description can be provided subsequent to submission 406 of the media bundle package to the media distribution system.

In one embodiment, the media bundle description can be provided in a markup language format. The markup language can, for example, be eXtensible Markup Language (XML). In one implementation, the descriptive metadata for the media bundle can, for example, include title, vendor identifier, distribution region, bundle file name, size and checksum for bundle file. If the media bundle is to include media items outside of the bundle file, such extra media items can also be identified in the descriptive metadata. For example, the extra media items can each be described by target path (or relative path) for the media item, vendor identifier, file name, size, and checksum.

While much of the content of the media bundle can easily be embedded in an archive formatted file (such as zip, tar, xar, etc.) for transmission as a single unit, there are certain components (e.g., extra media items) of the media bundle, e.g., video files, audio files, etc., i.e., outside the bundle file, that might require special processing (e.g., encoding, compression, encryption, etc.) between submission and purchase. These extra media items can be submitted alongside the archived formatted file and then when later purchased, the extra media items can be merged back into the resulting file structure at a client, whereby to the end-user the media bundle appears as a single, unified item. The "target path" mentioned in this paragraph refers to the intended path within the bundle where the extra items are to be placed. For example, the media bundle might be intended to include a video file at a relative path of "videos/making_of.m4v". This video file would may not be included within the media bundle archived formatted file at submission time, at which time it may not yet have been encoded or compressed in .m4v format, being provided instead in uncompressed ".mov" format. The "making_of-.mov" source file is therefore submitted alongside the media bundle archived formatted file, with a designated target path of "videos/making_of.m4v". The file name, size, and checksum refer to the file name, size, and checksum of the source ".mov" within the submission package. After submission, and prior to being made available for purchase, the video file can be encoded, compressed and encrypted. At purchase time, the resulting ".m4v" file is sent to the client alongside the media bundle archived formatted file, and the client, upon extracting the archive, merges the video back in at its designated relative path of "videos/making_of.m4v" within the bundle.

Examples of exemplary bundle descriptions are provided in Appendices A and B, where Appendix A contains descriptive data for a media item that is a music album and where Appendix B contains descriptive data for a media item that is a video. In either case, the descriptive metadata for the media bundle is provided within in a media_archive portion, with the remaining descriptive information primarily associated with the associated media item.

The header of the media bundle can provide an initial file for initiation of the media presentation. For example, the header can include a markup language file (e.g., ".html") that controls initial characteristics of the media presentation. The header can also include a format file (e.g., cascading style sheet ".css" file) that is used by the markup language file to provide formatting. As an example, the media presentation can be conceptually similar to a webpage, which also controlled by a markup language file.

On submission the conversion table typically contains those vendor identifiers used by the media bundle when providing a media presentation. For example, Table I discussed above illustrates a list of the vendor identifiers. In one embodiment, an electronic file, referred to a conversion table (e.g., conversion table 308) (or a manifest file), can specify the vendor identifiers used by the media bundle. Prior to distribution to a client device, the conversion data can be obtained for mapping the vendor identifiers to distributor identifiers. An example of a conversion table, referred to as a manifest file, according to one embodiment is as follows:

```
<?xml version="1.0" encoding="UTF-8"?>
<manifest version="1.0"
    xmlns:xsi="http://www.w3.org/2001/XMLSchema-instance"
    xmlns="http://apple.com/itunes/media_archive/manifest">
```

-continued

```
<library_items>
    <library_item xid="SonyBMG:isrc:USRC10900295" name="Some song"/>
    <library_item xid="SonyBMG:vendor_id:3137828" name="Some booklet"/>
    <library_item xid="SonyBMG:isrc:USRV80900149" name="Some video"/>
</library_items>
</manifest>
```

An exemplary media bundle can include a plurality of electronic files provided in an electronic package. The electronic package can be a compressed folder (e.g., zip file). Specifically, the exemplary media bundle can include the following files:

| Media Bundle |
| --- |
| styles.css |
| scripts.js |
| manifest.xml |
| index.html |
| image02.jpg |
| image01.jpg |

In this exemplary media bundle, as compared to the media bundle 302 shown in FIG. 3, the styles.css file can correspond to the header 303, the scripts.js file can correspond to the presentation program 304, the manifest.xml file can correspond to the conversion table 306, and the image01.jpg and image02.jpg files can correspond to the bundle media content 308.

Figure 5:
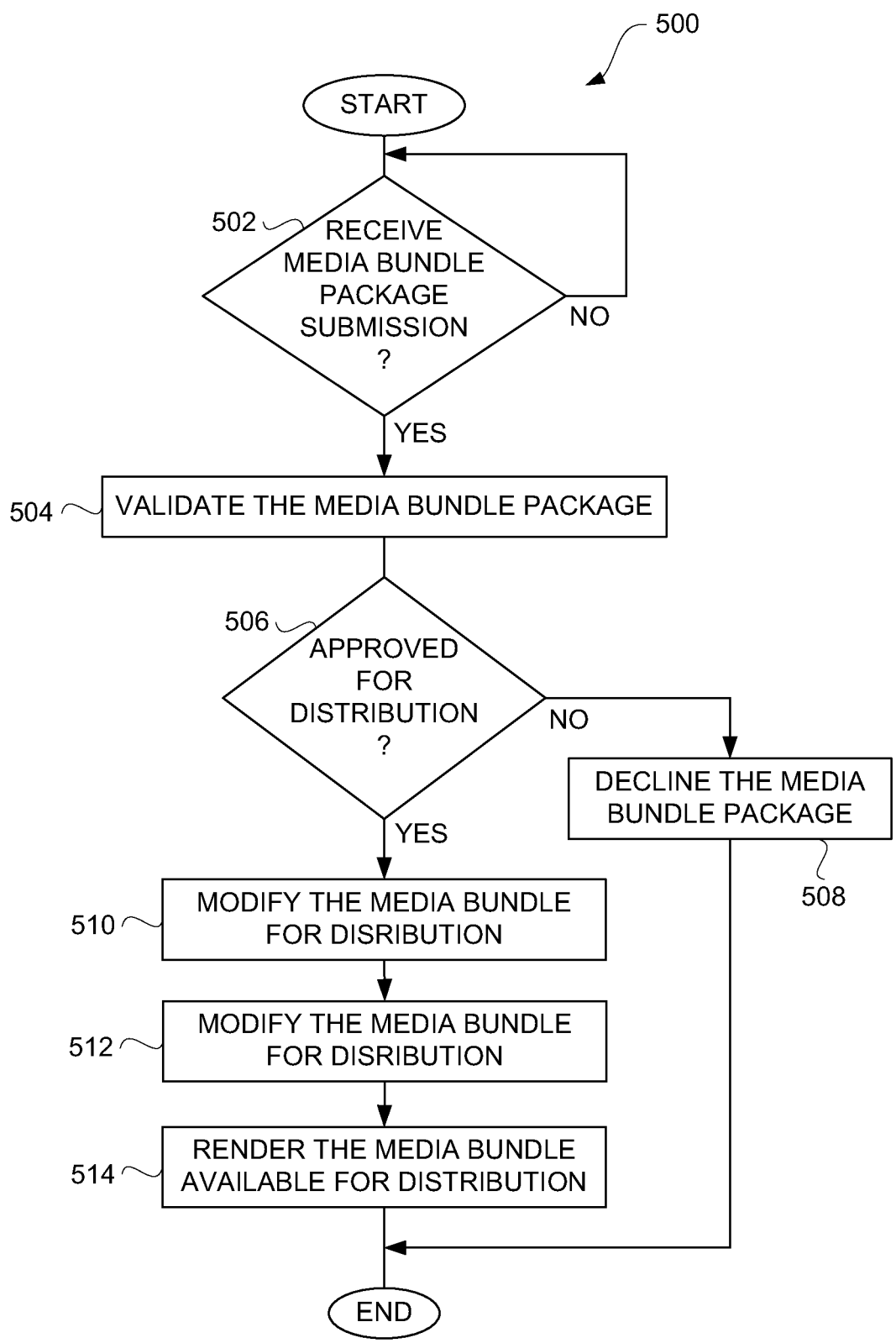
FIG. 5 is a flow diagram of a media bundle distribution process according to one embodiment.

FIG. 5 is a flow diagram of a media bundle distribution process 500 according to one embodiment. The media bundle distribution process 500 can, for example, be performed by the product submission and management system 104 illustrated in FIG. 1 or the media submission and management system 206 illustrated in FIG. 2.

The media bundle distribution process 500 can begin with a decision 502 that determines whether a media bundle package submission has been received. When the decision 502 determines that a media bundle package submission has not been received, the media bundle distribution process 500 can await such a package submission. In other words, the media bundle distribution process 500 can be invoked when a media bundle package submission has been received.

In any case, once the decision 502 determines that a media bundle package submission has been received, the media bundle package can be validated 504. After the validation 504, a decision 506 can determine whether the media bundle package, namely, the media bundle within the media bundle package, has been approved for distribution. When the decision 506 determines that the media bundle package is not approved for distribution, the media bundle package is declined 508. In this situation, the media bundle within the media bundle package is not made available for distribution. If desired, the submitter of the media bundle package can be informed that the media bundle package has been declined.

On the other hand, when the decision 506 determines that the media bundle package has been approved for distribution, the media bundle within the media bundle can be modified 510 for distribution. Here, the media bundle can, if desired, be modified. The modifications can alter, add or subtract from the contents of the media bundle. In one embodiment, the media bundle is in a compressed format, such as a compressed file/folder (e.g., pkzip); hence, modifications to the media bundle can involve uncompressing the media bundle, making modifications to the media bundle, and then compressing the modified media bundle. In addition, bundle media content (e.g., bundle media content 308) provided within the media bundle package can be also modified 512 if desired. For example, if a video asset were provided as bundle media content, the video asset can be transcoded to a suitable format. Next, the media bundle can be rendered 514 available for distribution. Following the block 508 or the block 514, the media bundle distribution process 500 can end.

Figure 6:
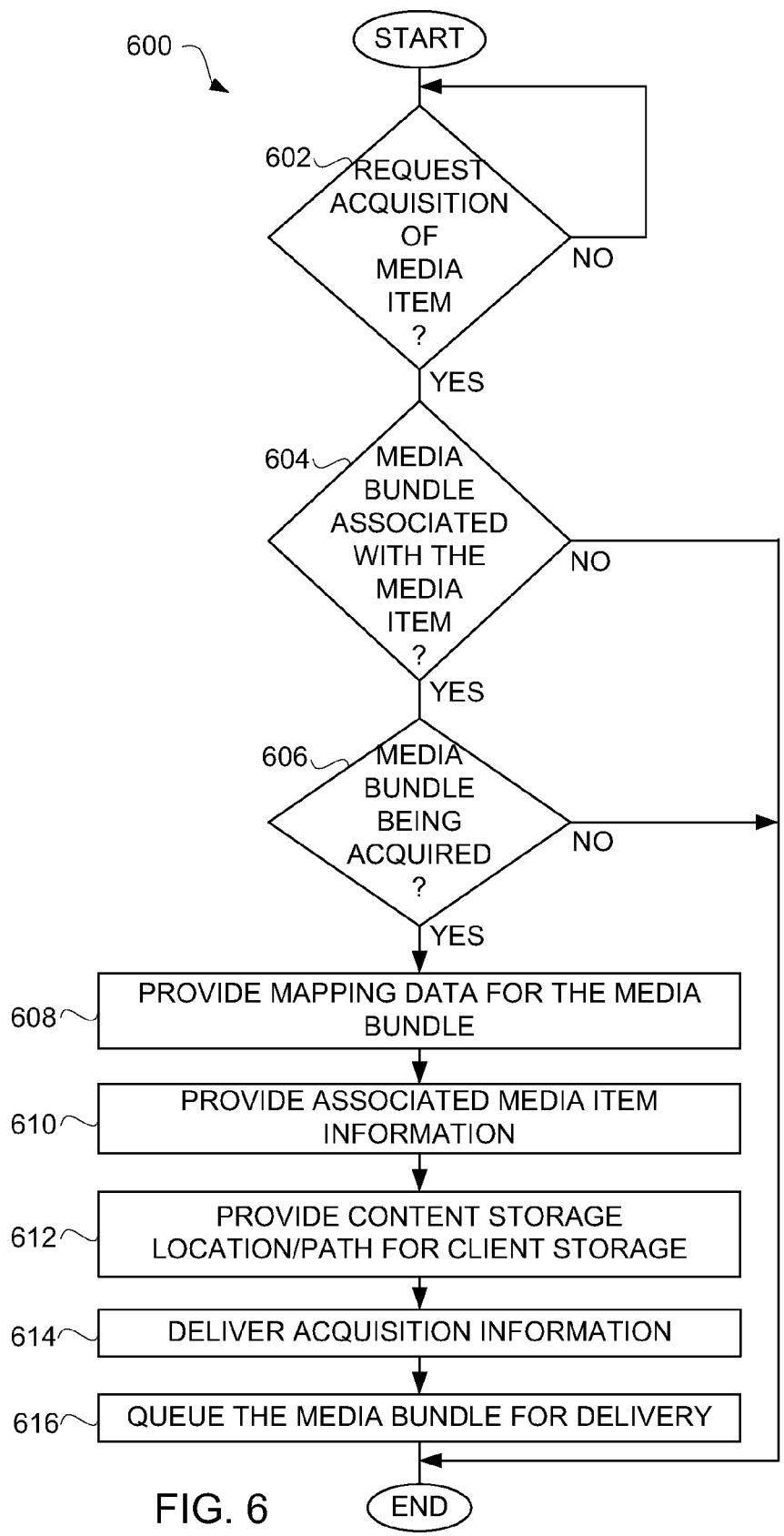
FIG. 6 is a flow diagram of a media bundle acquisition process according to one embodiment.

FIG. 6 is a flow diagram of a media bundle acquisition process 600 according to one embodiment. The media bundle acquisition process 600 can be performed by a distribution server. For example, the media bundle acquisition process 600 can be performed by the product distribution site 102 illustrated in FIG. 1 or the media distribution site 210 illustrated in FIG. 2.

The media bundle acquisition process 600 can begin with a decision 602 that determines whether a client device (or requestor/user of the client device) has requested acquisition of a media item that is available for distribution from a distribution server. When the decision 602 determines that a request for acquisition of a media item has not been received, the media bundle acquisition process 600 can await such a request. Alternatively, when the decision 602 determines that a request for acquisition of a media item has been received, a decision 604 can determine whether there is a media bundle associated with the media item. Here, the requestor has requested to acquire (e.g., purchase) a particular media item. This particular media item may or may not have an associated media bundle that can be acquired along with the acquisition of the particular media item. Hence, the decision 604 can determine whether the particular media item has a media bundle associated therewith. When the decision 604 determines that a media bundle is associated with the particular media item, a decision 606 can determine whether the media bundle is also to be acquired.

When the decision 606 determines that the media bundle is to be acquired, mapping data for the media bundle can be provided 608. Here, existing mapping data can be updated or new mapping can be provided. The mapping data can facilitate subsequent conversions between vendor identifiers and distributor identifiers to facilitate locating of digital media assets within a media library provided on or otherwise accessible to the client device. Table II discussed above provides an example of mapping data for conversion of vendor identifiers to distributor identifiers. Associated media item information can also be provided 610. The associated media item information is information that can be provided to the client device (or the media bundle itself) understands the media item to which the media bundle is associated. In addition, content storage locations/paths (e.g., relative paths) for data storage at the client device can be provided 612. The content storage locations/paths can be used to store data for digital media assets that are part of or linked to the media bundle at the client device. The mapping data, the associated media item information and the content storage locations/paths can be provided in the media bundle or can be provided in a separate electronic file. Acquisition information pertaining to at least the media bundle can be delivered 614 to the client device of the requestor. For example, the acquisition information can include not only information regarding acquisition of the media bundle (and possibly associated media item) but also any one or more of the mapping data, the associated media item information and content storage location/path. Further, the media bundle can be queued 616 for delivery to the client device of the requestor.

Following the block 616, the media bundle acquisition process 600 can end with the media bundle being queued for delivery to the client device of the requestor. Additionally, following the decision 604 when there is no media bundle associated with the media item being acquired or following the decision 606 when the media bundle exists but is not to be acquired, the media bundle acquisition process 600 can also end but without having made a media bundle available to the client device.

Figure 7:
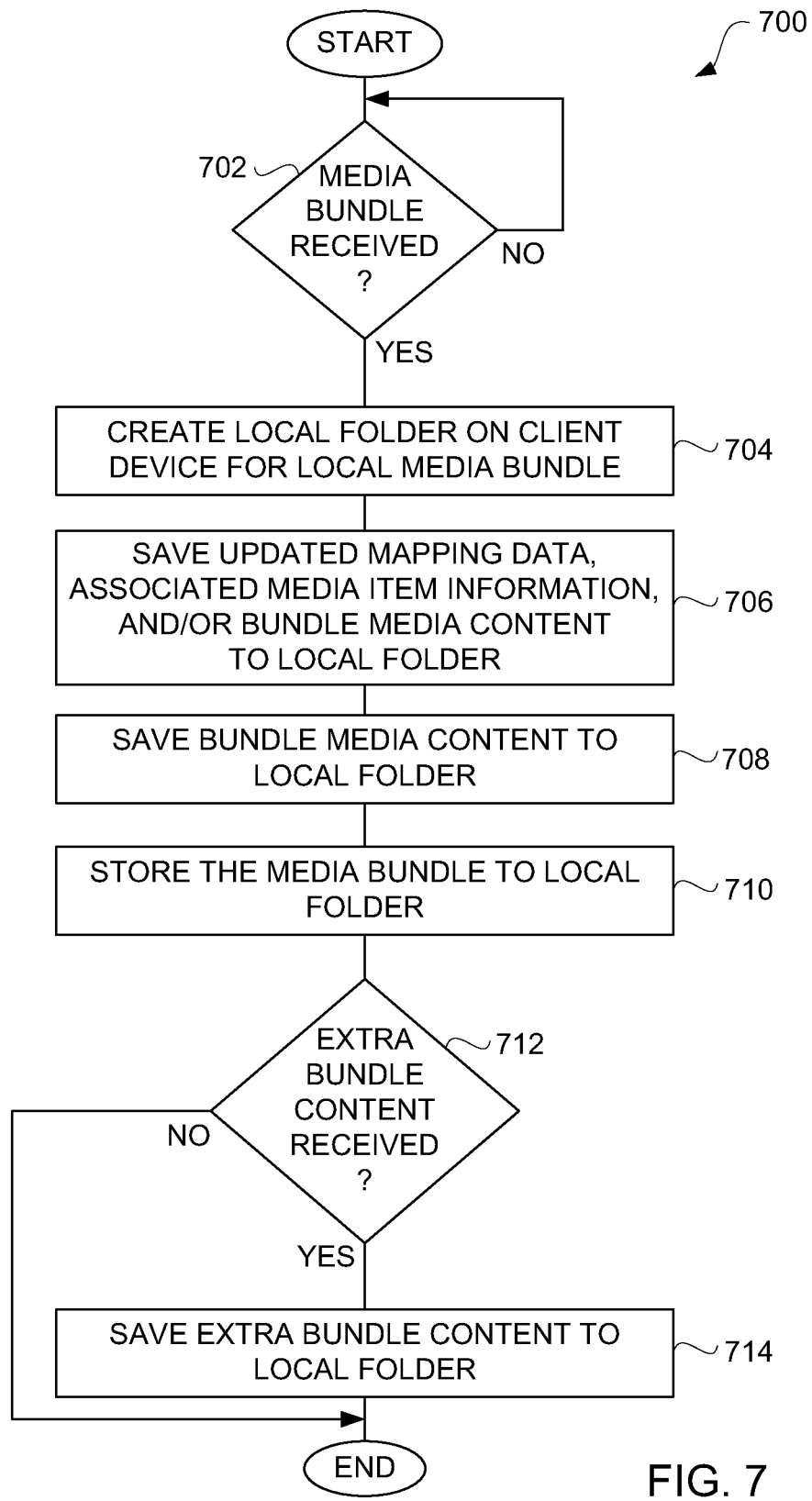
FIG. 7 is a flow diagram of a media bundle install process according to one embodiment.

FIG. 7 is a flow diagram of a media bundle install process 700 according to one embodiment. The media bundle install process 700 pertains to process that can be performed on a client device. For example, the client device can pertain to the client device 110 illustrated in FIG. 1 or the client device 212 illustrated in FIG. 2.

The media bundle install process 700 can begin with a decision 702 that determines whether a media bundle has been received. When the decision 702 determines that a media bundle has not been received, the media bundle install process 700 can await the receipt of a media bundle. In effect, the media bundle install process 700 can be deemed invoked when a media bundle is received.

On the other hand, once the decision 702 determines that a media bundle has been received at the client device, a local folder (or file directory) on the client device can be created 704. The local folder is provided in a storage device (e.g., file system) of the client device and is for storage of a local media bundle. The local media bundle is the localized version of the media bundle as stored on the client device.

After the local folder has been created 704 on the client device, updated mapping data and associated media item information can be saved 706 to the local folder. The updated mapping data and the associated media item information can be provided with the media bundle being received or can be received as a separate block of data. Also, besides the updated mapping data and associated media item information, digital assets (e.g., artwork) can be retrieved (e.g., from a remote media repository) can be saved 706 to the local folder. Path information for the content storage path/location can be provided to the client, thereby specifying a file system path (or location) where the digital assets, if any, are to be stored on the client device. In one embodiment, the content storage path/location is a path relative to the local folder.

In addition, bundle media content can be saved 708 to the local folder. The bundle media content is media content that is provided within the media bundle. The media bundle received can include media content (bundle media content), such as one of more digital media assets that are part of and used by the media bundle. For example, the client device can utilize the bundle media content when processing the media bundle to provide a media presentation in accordance with the media bundle. The bundle media content concerns digital media assets such as, for example, image files, audio files, or video files. Still further, the media bundle can be stored 710 to the local folder. The media bundle can, for example, include header, presentation program and/or conversion data. The media bundle being stored 710 is received at the client device from the product distribution site 102 illustrated in FIG. 1 or the media distribution site 210 illustrated in FIG. 2. The media bundle being received at the client device is the media bundle that was previously submitted for distribution, through modification could be made prior to distribution. In one embodiment, the media bundle received at the client device is in a compressed format, such as a compressed file/folder (e.g., pkzip). In such case, the storing of the media bundle to the local folder can involve uncompressing (e.g., unzip) the compressed folder and then copying (e.g., extracting) the contents of the now uncompressed folder to the local folder.

Next, a decision 712 can determine whether extra bundle content has been received for the media bundle. The media bundle can also include extra bundle content that can be delivered to the client device separate from the media bundle. For example, the extra bundle content can be digital media assets that are of significant file size can be separately provided to the client device. The extra bundle can also be separately processed, such as encoding, compressing, and/or separate encryption processing, prior to being delivered to the client device, whereon the extra media content can be merged into the media bundle.

In any case, when the decision 712 determines that extra bundle content has been received, the extra bundle content can be saved 714 to the local folder. To the extent that content storage location/path for extra bundle content has been provided to the client device (e.g., block 706), the extra bundle content can be stored at the local folder in the subfolder (or sub-directory) indicated by the content storage location/path. Following the block 714, or following the decision 712 when extra bundle content has not been received, the media bundle install process 700 can end.

As noted above, at block 706, mapping data and associated media item information and/or path information can be saved to a local folder on the client device for the media bundle. In one embodiment, the client device can receive an electronic file that contains the mapping data, associated media item information and/or path information. For example, the electronic file can be a property list file (plist file) provided in a markup language format (e.g., XML).

A first example of a plist file for a movie is provided below.

```
<?xml version="1.0" encoding="UTF-8" ?>
<!DOCTYPE plist (View Source for full doctype...)>
<plist version="1.0">
  <dict>
    <key>Metadata</key>
    <dict>
      <key>artistId</key>
      <integer>81758682</integer>
      <key>artistName</key>
      <string>Pixar</string>
      <key>itemId</key>
      <integer>330222324</integer>
      <key>itemName</key>
      <string>iTunes Extra - WALL-E</string>
      <key>kind</key>
      <string>feature-movie</string>
      <key>purchaseDate</key>
      <date>2009-09-05T04:28:55Z</date>
    </dict>
    <key>Name File</key>
    <string>iTunes Extra - WALL-E.ite</string>
    <key>associated-adam-ids</key>
    <array>
      <integer>286533539</integer>
    </array>
    <key>media-archive-version</key>
    <string>1.0</string>
    <key>owner-name</key>
    <string>David Makower</string>
    <key>xid-asset-mapping</key>
    <dict>
      <key>buenavista:upc:760894712785</key>
      <array>
        <integer>286533539</integer>
      </array>
    </dict>
  </dict>
</plist>
```

This first example of a plist file pertains to a movie with one media item that is identified by an identifier ("associated-adam-ids") and for which there is one possible "equivalent" media item that is specified by an identifier in mapping data ("xid-asset mapping"). In this example, the identifier in the mapping data (e.g., conversion table) is the same as the identifier for the identified media item, so there is no substitute or alternative available if the identified media item is unavailable.

A second example of a plist file for a playlist is provided below.

```
<?xml version="1.0" encoding="UTF-8" ?>
<!DOCTYPE plist (View Source for full doctype...)>
<plist version="1.0">
  <dict>
    <key>Metadata</key>
    <dict>
      <key>artistId</key>
      <integer>1001750</integer>
      <key>artistName</key>
      <string>Norah Jones</string>
      <key>itemId</key>
      <integer>330051443</integer>
      <key>itemName</key>
      <string>iTunes LP - Come Away With Me (Deluxe Version)</string>
      <key>playlistArtistName</key>
      <string>Norah Jones</string>
      <key>playlistId</key>
      <integer>328724357</integer>
      <key>playlistName</key>
      <string>Come Away With Me (Deluxe Version)</string>
      <key>purchaseDate</key>
      <date>2009-09-08T00:02:27Z</date>
    </dict>
    <key>Name File</key>
    <string>iTunes LP - Come Away With Me (Deluxe Version).itlp</string>
    <key>associated-adam-ids</key>
    <array>
      <integer>328724474</integer>
      <integer>328724609</integer>
      <integer>328724832</integer>
    </array>
    <key>media-archive-version</key>
    <string>1.0</string>
    <key>owner-name</key>
    <string>David Makower</string>
    <key>xid-asset-mapping</key>
    <dict>
      <key>EMI:isrc:USBN20100529</key>
      <array>
        <integer>328724474</integer>
        <integer>1001758</integer>
        <integer>14841735</integer>
        <integer>16139969</integer>
        <integer>16304280</integer>
        <integer>74175360</integer>
        <integer>328601975</integer>
        <integer>328652579</integer>
        <integer>330162878</integer>
      </array>
      <key>EMI:isrc:USBN20100531</key>
      <array>
        <integer>328724832</integer>
        <integer>328602187</integer>
        <integer>328652650</integer>
        <integer>330163025</integer>
      </array>
      <key>EMI:isrc:USBN20100532</key>
      <array>
        <integer>328724609</integer>
        <integer>1001764</integer>
        <integer>14841758</integer>
        <integer>16140036</integer>
        <integer>74175374</integer>
```

-continued

```
        <integer>328602084</integer>
        <integer>328652611</integer>
        <integer>330162902</integer>
      </array>
    </dict>
  </dict>
</plist>
```

This second example of a plist file pertains to a playlist having three media items (i.e., songs) that are identified by identifiers ("associated-adam-ids"). For each of the three media items, the second example includes a set of possible "equivalent" media items that is specified by identifiers in mapping data ("xid-asset mapping"). As such, for each of the identified media items (i.e., songs), the mapping data (i.e., conversion table) identifies potentially several equivalent media items in a user's media library that would be acceptable substitutes for the respective media items.

Figure 8:
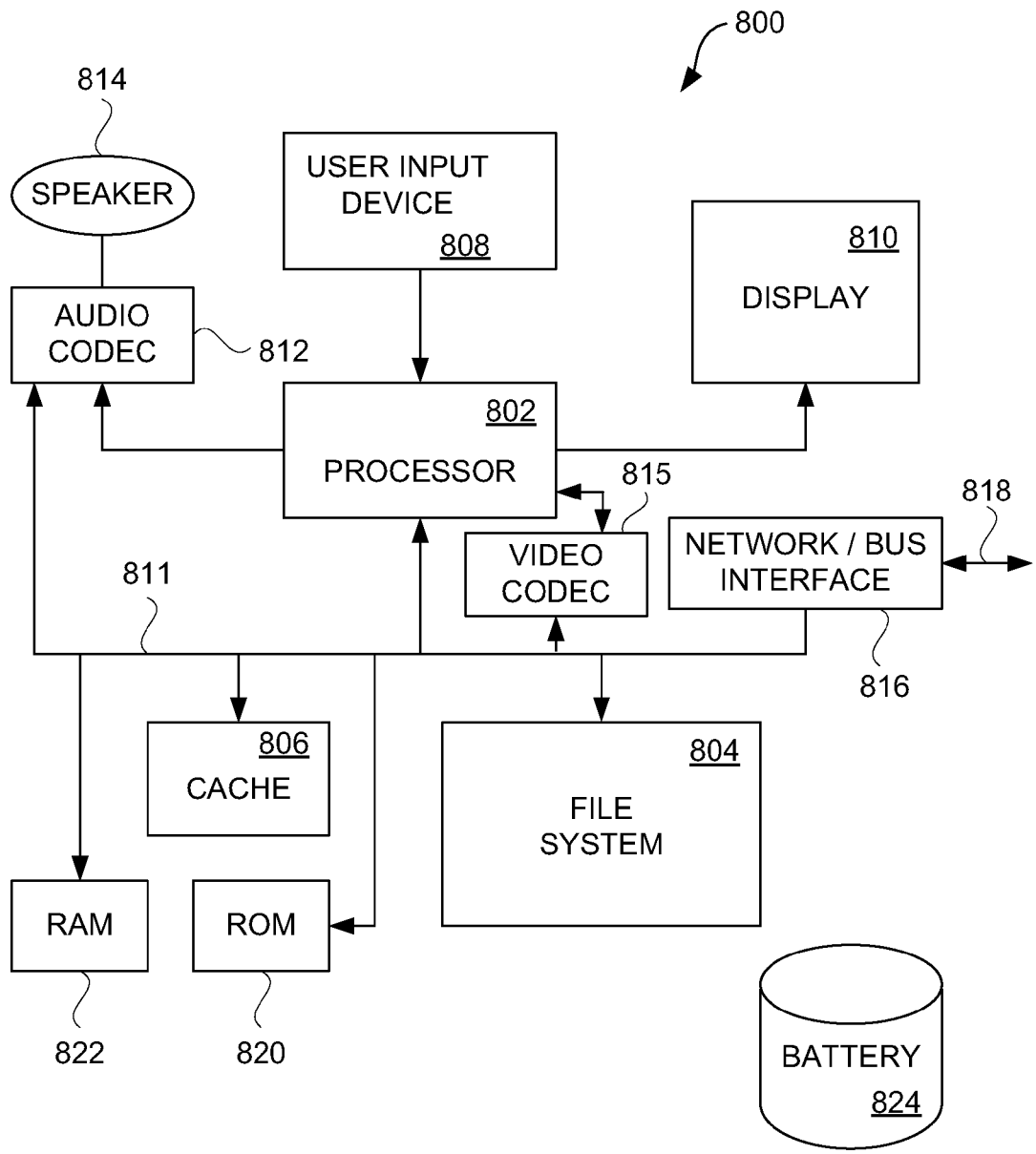
FIG. 8 is a block diagram of a computing device suitable for use with the invention.

The computing device can, for example, be an electronic device. FIG. 8 is a block diagram of a computing device 800 suitable for use with the invention. The computing device 800 illustrates circuitry of a representative portable electronic device.

The computing device 800 includes a processor 802 that pertains to a microprocessor or controller for controlling the overall operation of the computing device 800. The computing device 800 stores data pertaining to electronic files in a file system 804 and a cache 806. The file system 804 is, typically, semiconductor memory (e.g., Flash memory) and/or one or more storage disks. The file system 804 typically provides high capacity storage capability for the computing device 800. However, since the access time to the file system 804 can be relatively slow, the computing device 800 can also include the cache 806. The cache 806 is, for example, Random-Access Memory (RAM) provided by semiconductor memory. The relative access time to the cache 806 is typically shorter than for the file system 804. However, the cache 806 does not have the large storage capacity of the file system 804. Further, the file system 804, when active, consumes more power than does the cache 806. The power consumption is often a concern when the computing device 800 is a portable computing device that is powered by a battery 824. The computing device 800 also includes a Read-Only Memory (ROM) 820 and a RAM 822. The ROM 820 can store programs, utilities or processes to be executed in a non-volatile manner. The RAM 822 provides volatile data storage, such as for the cache 806.

The computing device 800 also includes a user input device 808 that allows a user of the computing device 800 to interact with the computing device 800. For example, the user input device 808 can take a variety of forms, such as a button, keypad, dial, touch-sensitive surface, etc. Still further, the computing device 800 includes a display 810 (screen display) that can be controlled by the processor 802 to display information to the user. A data bus 811 can facilitate data transfer between at least the file system 804, the cache 806, the processor 802, an audio coder/decoder (CODEC) 812 and/or a video CODEC 815.

In one embodiment, the computing device 800 serves to store a plurality of digital media assets, namely, media items (e.g., songs, videos, podcasts, etc.) in the file system 804. When a user desires to have the computing device play a particular media item, using the user input device 808, a user can select one of the available media items. The processor 802, upon receiving a selection of a particular media item, supplies the media data to one or more appropriate output devices. If the particular media item is encrypted, the particular media item is first decrypted. As an example, for audio output, the processor 802 can supply the media data (e.g., audio file) for the particular media item to the audio CODEC 812. The audio CODEC 812 can then produce analog output signals for a speaker 814. The speaker 814 can be a speaker internal to the computing device 800 or external to the computing device 800. For example, headphones or earphones that connect to the computing device 800 would be considered an external speaker. As another example, for video output, the processor 802 can supply the media data (e.g., video file) for the particular media item to the video CODEC 815. The video CODEC 815 can then produce output signals for the display 810 and/or the speaker 814.

The computing device 800 also includes a network/bus interface 816 that couples to a data link 818. The data link 818 allows the computing device 800 to couple to another device (e.g., another computing device, server computer, a host computer, or an accessory device). The data link 818 can be provided over a wired connection or a wireless connection. In the case of a wireless connection, the network/bus interface 816 can include a wireless transceiver. The data link 818 can, in some cases, also provide power to the computing device 800 (e.g., to charge the battery 824).

For additional details, including details on conversion data for identification of digital media assets, see U.S. patent application Ser. No. 12/555,643, filed Sep. 8, 2009, and entitled "DISTRIBUTION AND USAGE OF MEDIA BUNDLES", which is herein incorporated by reference. For still more additional details, including details on programming interfaces for facilitating use of media bundles to produce media presentations, see U.S. patent application Ser. No. 12/555,539, filed Sep. 8, 2009, and entitled "PROGRAMMING INTERFACE FOR USE BY MEDIA BUNDLES TO PROVIDE MEDIA PRESENTATIONS", which is herein incorporated by reference.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

APPENDIX A

```xml
<?xml version="1.0" encoding="UTF-8"?>
<package xmlns="http://apple.com/itunes/importer" version="music3.3">
    <provider>ABCMusic</provider>
    <album>
        <album_upc>10000000090019</album_upc>
        <album_title>One Track And A Cocktail</album_title>
        <original_release_date>2009-09-14</original_release_date>
        <album_label_name>ABC Records</album_label_name>
        <album_genres>
            <genre>Rock</genre>
            <genre>Pop</genre>
        </album_genres>
        <album_copyright_pline>2009 ABC Records</album_copyright_pline>
        <album_copyright_cline>2009 ABC Records</album_copyright_cline>
        <album_artwork_files>
            <file>
                <file_name>cover.tif</file_name>
                <checksum
                    type="md5">3c579894ca25b9af338e7ba0fb3e4fab
                </checksum>
            </file>
        </album_artwork_files>
        <album_volume_count>1</album_volume_count>
        <album_track_count>2</album_track_count>
        <album_products>
            <product>
                <territory>US</territory>
                <wholesale_price_tier>3</wholesale_price_tier>
                <sales_start_date>2009-09-14</sales_start_date>
            </product>
        </album_products>
        <album_artists>
            <artist>
                <name>Sandy Beach and the Cocktails</name>
                <primary>true</primary>
            </artist>
        </album_artists>
        <album_tracks>
            <track>
                <track_isrc>USMPK0501901</track_isrc>
                <!-- Resulting XID is ABCMusic:isrc:USMPK0501901 -->
```

APPENDIX A-continued

```xml
                <xid scheme="isrc"/>
                <track_title>Lone Track</track_title>
                <track_label_name>ABC Records</track_label_name>
                <track_copyright_pline>2009 ABC Records</track_copyright_pline>
                <track_volume_number>1</track_volume_number>
                <track_number>1</track_number>
                <track_audio_file>
                    <file_name>01-lone-track.flac</file_name>
                    <checksum
                        type="md5">4edd5364f6be1f55e570dee08e3f4715</checksum>
                </track_audio_file>
                <track_products>
                    <product>
                        <territory>US</territory>
                        <cleared_for_sale>true</cleared_for_sale>
                    </product>
                </track_products>
                <track_artists>
                    <artist>
                        <name>Sandy Beach and the Cocktails</name>
                        <primary>true</primary>
                    </artist>
                </track_artists>
            </track>
            <media_archive>
                <title>Special Features</title>
                <vendor_id>USMPK0501902</vendor_id>
                <volume_number>1</volume_number>
                <track_number>2</track_number>
                <products>
                    <product>
                        <territory>WW</territory>
                        <cleared_for_sale>true</cleared_for_sale>
                    </product>
                </products>
                <archive_file>
                    <file_name>media_archive.zip</file_name>
                    <size>1249</size>
                    <checksum>7261c0ff623551f9504f970009141473</checksum>
                </archive_file>
                <extras>
                    <extra>
                        <target_path>video/extra_01.m4v</target_path>
                        <vendor_id>USMPK0501921</vendor_id>
                        <assets>
                            <asset type="full">
                                <data_file role="source">
                                    <file_name>
                                        TheMakingOfOneTrackAndACocktail.mov</file_name>
                                    <size>18038942</size>
                                    <checksum type="md5">
                                        a43a9957516e82e276db14760c2b7187
                                    </checksum>
                                </data_file>
                            </asset>
                        </assets>
                    </extra>
                </extras>
            </media_archive>
        </album_tracks>
    </album>
</package>
```

APPENDIX B

```xml
<?xml version="1.0" encoding="UTF-8"?>
<package version="film3.3.1">
    <language>en-US</language>
    <provider>sonypicturesentertainment</provider>
    <video>
        <type>film</type>
        <subtype>feature</subtype>
        <title>The Da Vinci Code</title>
```

APPENDIX B-continued

```xml
<!--
   Resulting XID is
   sonypicturesentertainment:vendor_id:DA_VINCI_CODE_2006
-->
<xid scheme="vendor_id"/>
<vendor_id>DA_VINCI_CODE_2006</vendor_id>
<isan>0000-0001-68D7-0000-U-0000-0000-L</isan>
<amg_video_id>309461</amg_video_id>
<country>US</country>
<production_company>Sony Pictures</production_company>
<copyright_cline>2006 Columbia Pictures Industries, Inc. All Rights
   Reserved.</copyright_cline>
<release_date>2006-11-07</release_date>
<synopsis>Dan Brown's international bestseller comes alive in the
film The Da Vinci Code, directed by Ron Howard with a screenplay by
Akiva Goldsman. Join symbologist Robert Langdon (Academy Award ® Winner
Tom Hanks, 1993 Best Actor, Philadelphia, and 1994 Best Actor, Forrest
Gump) and cryptologist Sophie Neveu (Audrey Tautou) in their heart-
racing quest to solve a bizarre murder mystery that will take them from
France to England and behind the veil of a mysterious ancient society,
where they discover a secret protected since the time of Christ. With
first-rate performances by Sir Ian McKellen, Alfred Molina and Jean
Reno, critics are calling The Da Vinci Code 'involving'* and
'intriguing,'* 'a first rate thriller.'**</synopsis>
   <genres>
      <genre>Action & Adventure</genre>
      <genre>Thriller</genre>
   </genres>
   <ratings>
      <rating system="mpaa" reason="For disturbing images, violence, some
nudity, thematic material, brief drug references and sexual content."
         >PG-13</rating>
      <rating system="ca-chvrs">14A</rating>
      <rating system="bbfc">TBC</rating>
   </ratings>
   <cast>
      <actor name="Tom Hanks" display="Tom Hanks" billing="top">Dr.
Robert Langdon</actor>
      <actor name="Audrey Tautou" display="Audrey Tautou"
billing="top">Agent Sophie Neveu</actor>
      <actor name="Ian McKellen" display="Ian McKellen" billing="top">Sir
Leigh Teaming</actor>
      <actor name="Jürgen Prochnow" display="Jürgen Prochnow"
billing="top">Vernet</actor>
      <actor name="Alfred Molina" display="Alfred Molina"
billing="top">Bishop Manuel Aringarosa</actor>
      <actor name="Paul Bettany" display="Paul Bettany"
billing="top">Silas</actor>
      <actor name="Jean Reno" display="Jean Reno" billing="top">Captain
Bezu Fache</actor>
   </cast>
   <crew>
      <member name="John Calley" display="John Calley"
billing="top">Producer</member>
      <member name="Brian Grazer" display="Brian Grazer"
billing="top">Producer</member>
      <member name="Ron Howard" display="Ron Howard"
billing="top">Director</member>
   </crew>
   <products>
      <product>
         <territory>US</territory>
         <cleared_for_sale>true</cleared_for_sale>
         <sales_start_date>2008-01-15</sales_start_date>
         <wholesale_price_tier>55</wholesale_price_tier>
         <cleared_for_vod>false</cleared_for_vod>
         <cleared_for_hd_vod>true</cleared_for_hd_vod>
         <cleared_for_hd_sale>true</cleared_for_hd_sale>
      </product>
   </products>
   <assets>
      <asset type="full">
         <data_file role="source">
            <size>9537261572</size>
            <file_name>DA_VINCI_CODE_2006_178_2398.mpg</file_name>
            <checksum
type="md5">60c8c0daeccf87cbc636d478c777cdb3</checksum>
         </data_file>
         <data_file role="chapters">
            <size>3315</size>
```

APPENDIX B-continued

```xml
            <file_name>DA_VINCI_CODE_2006_chapters.xml</file_name>
            <checksum type="md5">6be14464dc2e33a81ecad41c19b5ba93</checksum>
         </data_file>
         <data_file role="chapters">
            <size>59497</size>
            <file_name>da_vinci_code_2006_ch01.jpg</file_name>
            <checksum type="md5">2dd638c98b2712c9cfe1f57f97033e75</checksum>
         </data_file>
         <data_file role="chapters">
            <size>129804</size>
            <file_name>da_vinci_code_2006_ch02.jpg</file_name>
            <checksum type="md5">9e87908dfc903e7838241d08fdd0a312</checksum>
         </data_file>
         <data_file role="chapters">
            <size>162340</size>
            <file_name>da_vinci_code_2006_ch03.jpg</file_name>
            <checksum type="md5">a575b9d028ae68325e6521d392c7a195</checksum>
         </data_file>
         <data_file role="chapters">
            <size>137988</size>
            <file_name>da_vinci_code_2006_ch04.jpg</file_name>
            <checksum type="md5">b9bc5dc468e2358cef9cf119264963f4</checksum>
         </data_file>
         <data_file role="chapters">
            <size>178695</size>
            <file_name>da_vinci_code_2006_ch05.jpg</file_name>
            <checksum type="md5">992d13a2039515a7780acd8561240473</checksum>
         </data_file>
      </asset>
      <asset type="preview">
         <data_file role="source">
            <size>349899120</size>
            <file_name>DA_VINCI_CODE_2006_Trailer_235_24_20mb.mpg</file_name>
            <checksum type="md5">3709c467f4e81b154ddf3818cc9310ab</checksum>
         </data_file>
      </asset>
      <asset type="artwork">
         <data_file>
            <file_name>posterart.jpg</file_name>
            <checksum type="md5">1c1383ed20c0ecbbfa8a2ac5ed22a886</checksum>
         </data_file>
      </asset>
   </assets>
   <media_archive>
      <title>The Da Vinci Code: Special Features</title>
      <vendor_id>DA_VINCI_CODE_2006_SPECIAL_FEATURES</vendor_id>
      <products>
         <product>
            <territory>US</territory>
            <cleared_for_sale>true</cleared_for_sale>
         </product>
      </products>
      <archive_file>
         <file_name>da_vinci_code_2006_special_features.zip</file_name>
         <checksum>7261c0ff623551f9504f970009141473</checksum>
         <size>1249</size>
      </archive_file>
      <extras>
         <extra>
            <target_path>video/extra_01.m4v</target_path>
            <vendor_id>DA_VINCI_CODE_2006_MAKING_OF</vendor_id>
            <assets>
               <asset type="full">
                  <data_file role="source">
                     <file_name>DaVinciCodeMakingOf.mov</file_name>
                     <size>18038942</size>
                     <checksum type="md5">
                        a43a9957516e82e276db14760c2b7187
                     </checksum>
                  </data_file>
               </asset>
            </assets>
```

APPENDIX B-continued

```
    </extra>
   </extras>
  </media_archive>
 </video>
</package>
```

What is claimed is:

1. A non-transitory computer readable storage medium having stored therein instructions which, when executed by a processor, cause the processor to perform operations comprising:
generating a digital media bundle comprising media item information that identifies at least one media item in a media library accessible to a client computing device and computer program code for coordinating playback, interactive components and formatting of a media presentation at the client computing device, wherein the media presentation is associated with the at least one media item;
associating the digital media bundle with descriptive metadata, wherein the descriptive metadata specifies information about the digital media bundle, the at least one media item, and at least one extra media item outside the digital media bundle to be merged into the digital media bundle; and
sending the digital media bundle to the client computing device.

2. The non-transitory computer readable storage medium of claim 1, wherein the digital media bundle comprises bundle media content utilized by the media presentation.

3. The non-transitory computer readable storage medium of claim 2, wherein the bundle media content comprises a media item.

4. The non-transitory computer readable storage medium of claim 3, wherein the at least one media item comprises at least one of an image file, a video file or an audio file.

5. The non-transitory computer readable storage medium of claim 1, wherein the computer program code is a JavaScript program.

6. The non-transitory computer readable storage medium of claim 1, storing additional instructions which, when executed by the processor, result in a further operation comprising mapping data configured to associate vendor identifiers to distributor identifiers to yield mapping data, and wherein the mapping data is used to assist the computer program code in locating at least one presentation media item in the media library.

7. The non-transitory computer readable storage medium of claim 6, wherein the mapping data maps a vendor identifier associated with the at least one presentation media item used in the computer program code to a distributor identifier used in the media library.

8. The non-transitory computer readable storage medium of claim 6, wherein the media library is a local media library resident on the client computing device, and wherein the mapping data identifies the at least one media item in the media library.

9. The non-transitory computer readable storage medium of claim 1, wherein the digital media bundle is provided in a compressed electronic folder.

10. The non-transitory computer readable storage medium of claim 1, wherein the computer program code is a distinct computer program file.

11. The non-transitory computer readable storage medium of claim 10, wherein the distinct computer program code is a JavaScript program file.

12. A system comprising:
a processor; and
a computer-readable storage medium having stored therein instructions which, when executed by the processor, cause the processor to perform operations comprising:
receiving a digital media bundle comprising media item information that identifies at least one media item in a media library accessible to a client computing device that is associated with the digital media bundle and program code for coordinating playback, interactive components and formatting of a media presentation at the client computing device;
generating conversion data associating a vendor identifier associated with the at least one media item to at least one distributor identifier, wherein the at least one distributor identifier indicates that a first media item associated with the at least one distributor identifier is deemed equivalent to a second media item associated with the vendor identifier;
associating the digital media bundle with descriptive metadata about the digital media bundle, wherein the descriptive metadata specifies information about the digital media bundle, the at least one media item, and at least one extra media item outside the digital media bundle to be merged into the digital media bundle; and
sending the digital media bundle and the conversion data to the client computing device.

13. The system of claim 12, wherein the digital media bundle further includes bundle media content utilized by the media presentation, and wherein the at least one media item comprises at least one of an image file, a video file or an audio file.

14. The system of claim 12, wherein the conversion data maps the vendor identifier for the at least one presentation media item used in the computer program code to the distributor identifier used in the media library.

15. The system of claim 14, wherein the media library is a local media library resident on the client computing device.

16. The system of claim 15, wherein the conversion data identifies the at least one media item from the media library for use by the computer program code.

17. The system of claim 14, wherein the conversion data includes a type of vendor associated with the vendor identifier, and a namespace the vendor identifier.

18. A method comprising:
generating a digital media bundle comprising media item information that identifies at least one media item in a media library accessible to a client computing device and computer program code for coordinating playback, interactive components and formatting of a media presentation at the client computing device, wherein the media presentation is associated with the at least one media item;
associating the digital media bundle with descriptive metadata about the digital media bundle, wherein the descriptive metadata specifies information about the digital media bundle, the at least one media item, and at least one extra media item outside the digital media bundle to be merged into the digital media bundle; and sending the digital media bundle to a server for distribution to the client computing device.

* * * * *